United States Patent
Chandra et al.

(10) Patent No.: US 11,754,288 B2
(45) Date of Patent: Sep. 12, 2023

(54) COMBUSTOR MIXING ASSEMBLY

(71) Applicant: General Electric Company, Schenectady, NY (US)

(72) Inventors: Hari Ravi Chandra, Bangalore (IN); Arvind Kumar Rao, Bangalore (IN); Shai Birmaher, West Chester, OH (US); Jayanth Sekar, Bangalore (IN); Gurunath Gandikota, Bangalore (IN); Michael A. Benjamin, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/115,877

(22) Filed: Dec. 9, 2020

(65) Prior Publication Data
US 2022/0178540 A1   Jun. 9, 2022

(51) Int. Cl.
| | |
|---|---|
| F23R 3/00 | (2006.01) |
| F23R 3/34 | (2006.01) |
| F23R 3/28 | (2006.01) |
| F02C 7/22 | (2006.01) |
| F23D 14/70 | (2006.01) |
| F23D 14/64 | (2006.01) |

(52) U.S. Cl.
CPC .............. *F23R 3/343* (2013.01); *F02C 7/222* (2013.01); *F23D 14/64* (2013.01); *F23D 14/70* (2013.01); *F23R 3/286* (2013.01); *F05D 2240/35* (2013.01); *F23D 2206/10* (2013.01)

(58) Field of Classification Search
None
See application file for complete search history.

(56) References Cited

U.S. PATENT DOCUMENTS

| | | | | |
|---|---|---|---|---|
| 3,116,606 | A | * | 1/1964 | Dougherty .............. F23R 3/283 60/39.826 |
| 5,351,477 | A | * | 10/1994 | Joshi ..................... F23D 17/002 60/737 |
| 5,833,141 | A | | 11/1998 | Bechtel, II et al. |

(Continued)

FOREIGN PATENT DOCUMENTS

| | | |
|---|---|---|
| CN | 108561897 A | 9/2018 |
| CN | 109737452 A | 5/2019 |
| CN | 111425294 A | 7/2020 |

*Primary Examiner* — Edwin Kang
(74) *Attorney, Agent, or Firm* — Venable LLP; Edward A. Kmett; Michele V. Frank

(57) ABSTRACT

A mixing assembly for a combustor, including: a pilot mixer and a pilot fuel nozzle; a main mixer including: a main housing surrounding the pilot mixer; a fuel manifold positioned between the pilot housing and the main housing; a mixer foot extending outward from a forward end of the main housing; a main swirler body surrounding the main housing such that an annular mixing channel is defined between the main housing and the main swirler body, and coupled to the mixer foot; and a main fuel ring in the mixing channel downstream of the mixer foot connected to the main housing by main fuel vanes, at least one of the main fuel ring and the main fuel vanes including fuel injection ports positioned to discharge fuel into a central portion of the mixing channel, wherein the mixer foot extends farther from the main housing than the main fuel ring.

6 Claims, 9 Drawing Sheets

(56) References Cited

U.S. PATENT DOCUMENTS

| | | | | |
|---|---|---|---|---|
| 5,865,024 A | * | 2/1999 | Kress | F23R 3/36 |
| | | | | 60/737 |
| 6,732,527 B2 | | 5/2004 | Freeman et al. | |
| 6,820,425 B2 | | 11/2004 | David et al. | |
| 8,365,531 B2 | | 2/2013 | Pidcock et al. | |
| 8,590,311 B2 | | 11/2013 | Parsania et al. | |
| 9,435,537 B2 | | 9/2016 | ELKady et al. | |
| 10,018,167 B2 | | 7/2018 | Tentorio | |
| 2005/0268618 A1 | * | 12/2005 | Johnson | F23R 3/286 |
| | | | | 60/737 |
| 2007/0028617 A1 | * | 2/2007 | Hsieh | F23R 3/286 |
| | | | | 60/737 |
| 2007/0028618 A1 | * | 2/2007 | Hsiao | F23R 3/343 |
| | | | | 60/737 |
| 2008/0098737 A1 | * | 5/2008 | Haggerty | F02C 7/22 |
| | | | | 60/740 |
| 2010/0058765 A1 | * | 3/2010 | Duval | F23R 3/283 |
| | | | | 60/740 |
| 2010/0251719 A1 | | 10/2010 | Mancini et al. | |
| 2011/0067403 A1 | * | 3/2011 | Williams | F23R 3/286 |
| | | | | 60/742 |
| 2012/0240592 A1 | | 9/2012 | Keny et al. | |
| 2013/0145765 A1 | | 6/2013 | Patel et al. | |
| 2015/0323187 A1 | * | 11/2015 | Gomez del Campo | |
| | | | | F02C 7/266 |
| | | | | 60/737 |
| 2016/0177834 A1 | * | 6/2016 | Patel | F23R 3/346 |
| | | | | 239/403 |
| 2016/0265779 A1 | | 9/2016 | Haynes et al. | |
| 2016/0326962 A1 | | 11/2016 | Wysocki et al. | |
| 2018/0135521 A1 | * | 5/2018 | Jung | F23R 3/14 |
| 2019/0101062 A1 | * | 4/2019 | Vise | F02C 9/34 |

* cited by examiner

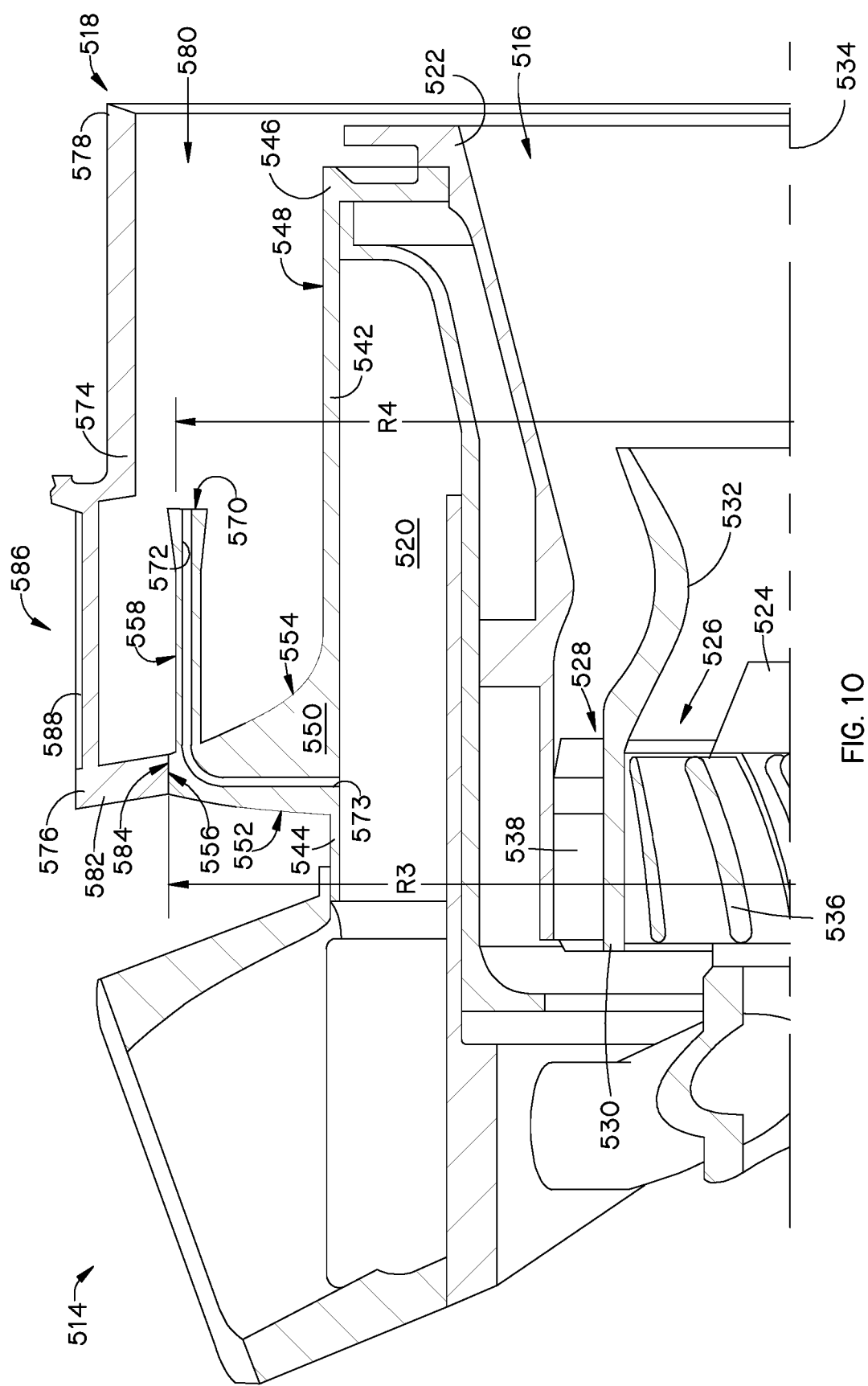

COMBUSTOR MIXING ASSEMBLY

BACKGROUND OF THE INVENTION

The present invention relates generally to combustors, and more particularly to gas turbine engine combustor mixing assemblies.

A gas turbine engine typically includes, in serial flow communication, a low-pressure compressor or booster, a high-pressure compressor, a combustor, a high-pressure turbine, and a low-pressure turbine. The combustor generates combustion gases that are channeled in succession to the high-pressure turbine where they are expanded to drive the high-pressure turbine, and then to the low-pressure turbine where they are further expanded to drive the low-pressure turbine. The high-pressure turbine is drivingly connected to the high-pressure compressor via a first rotor shaft, and the low-pressure turbine is drivingly connected to the booster via a second rotor shaft.

One type of combustor known in the prior art includes an annular dome assembly interconnecting the upstream ends of annular inner and outer liners. Typically, the dome assembly is provided with swirlers having arrays of vanes. The vanes are effective to produce counter-rotating air flows that generate shear forces which break up and atomize injected fuel prior to ignition. This type may be referred to as twin annular premixed swirler or "TAPS" type combustor.

In the prior art, fuel injection in the main stage of TAPS combustors is typically liquid jet in cross flow or "LJIC", with fuel being discharged radially from a center body of the fuel nozzle. There is a desire to use other types of fuel injection.

BRIEF DESCRIPTION OF THE INVENTION

According to one aspect of the technology described herein a mixing assembly for a combustor includes: a pilot mixer including an annular pilot housing having a hollow interior extending along a mixer centerline and a pilot fuel nozzle mounted in the housing; a main mixer including: a main housing surrounding the pilot, the main housing having forward and aft ends; a fuel manifold positioned between the pilot housing and the main housing; a mixer foot extending outward from the forward end of the main housing; a main swirler body including a plurality of vanes, the main swirler body surrounding the main housing such that an annular mixing channel is defined between the main housing and the main swirler body, and being coupled to the mixer foot; and a main fuel ring disposed in the mixing channel downstream of the mixer foot and connected to the main housing by an array of main fuel vanes, at least one of the main fuel ring and the main fuel vanes including a plurality of fuel injection ports positioned to discharge fuel into a central portion of the mixing channel, wherein the mixer foot extends farther from the main housing than the main fuel ring.

According to another aspect of the technology described herein, a mixing assembly for a combustor includes: a pilot mixer including an annular pilot housing having a hollow interior extending along a mixer centerline and a pilot fuel nozzle mounted in the housing; a main mixer including: a main housing surrounding the pilot, the main housing having forward and aft ends; a fuel manifold positioned between the pilot housing and the main housing; a mixer foot extending outward from the forward end of the main housing; a main swirler body including a plurality of vanes, the main swirler body surrounding the main housing such that an annular mixing channel is defined between the main housing and the main swirler body, and being coupled to the mixer foot; and an annular main fuel ring extending axially aft from the mixer foot into the mixing channel, wherein the mixer foot extends farther from the main housing than the main fuel ring; and wherein at least one of the mixer foot and the main fuel ring includes a plurality of fuel injection ports positioned to discharge fuel into a central portion of the mixing channel.

BRIEF DESCRIPTION OF THE DRAWINGS

The invention may be best understood by reference to the following description taken in conjunction with the accompanying drawing figures in which:

FIG. 10 is half-sectional view of an alternative mixing assembly;

DETAILED DESCRIPTION OF THE INVENTION

Figure 1:
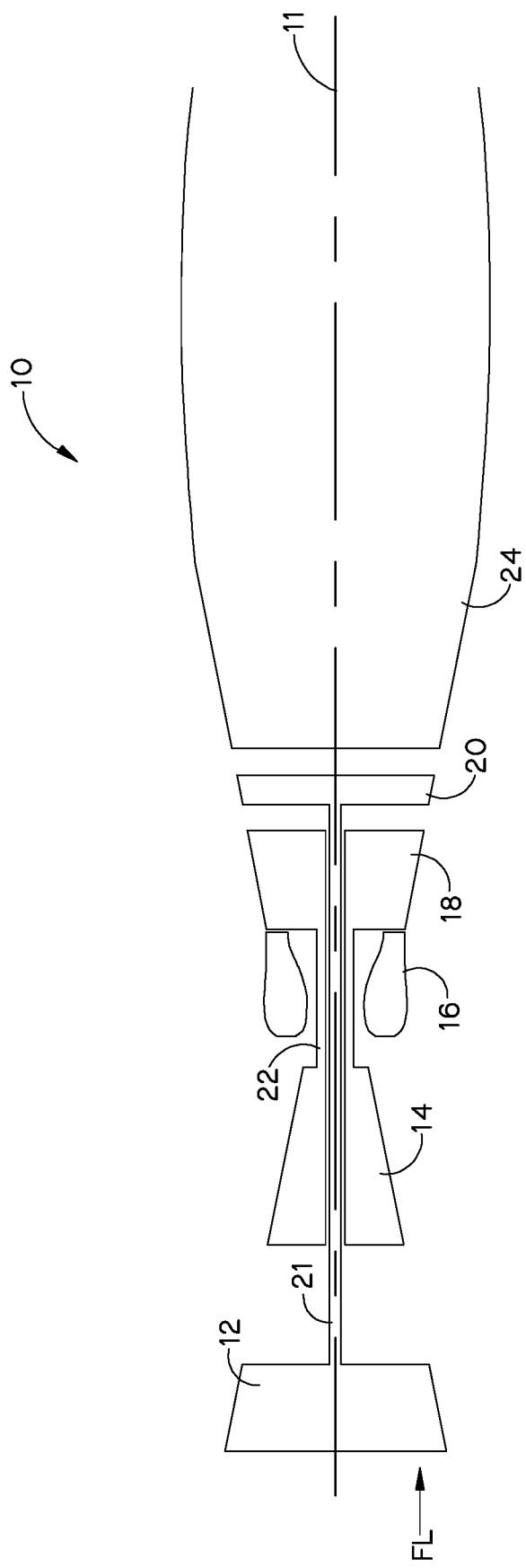
FIG. 1 is a schematic diagram of a gas turbine engine.

Referring to the drawings wherein identical reference numerals denote the same elements throughout the various views, FIG. 1 is a schematic illustration of a gas turbine engine 10 including a low-pressure compressor 12, a high-pressure compressor 14, and a combustor 16. The engine 10 also includes a high-pressure turbine 18 and a low-pressure turbine 20. The low-pressure compressor 12 and the low-pressure turbine 20 are coupled by a first shaft 21, and the high-pressure compressor 14 and turbine 18 are coupled by a second shaft 22. First and second shafts 21, 22 are disposed coaxially about a centerline axis 11 of the engine 10.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "FL" in FIG. 1. These directional terms are used merely for convenience in description and do not require a particular orientation of the structures described thereby.

In operation, air flows through the low-pressure compressor 12 and compressed air is supplied from low-pressure compressor 12 to high-pressure compressor 14. The highly compressed air is delivered to combustor, referenced generically at 16. Combustion gases from combustor 16 drive turbines 18 and 20 and exits gas turbine engine 10 through a nozzle 24.

Figure 2:
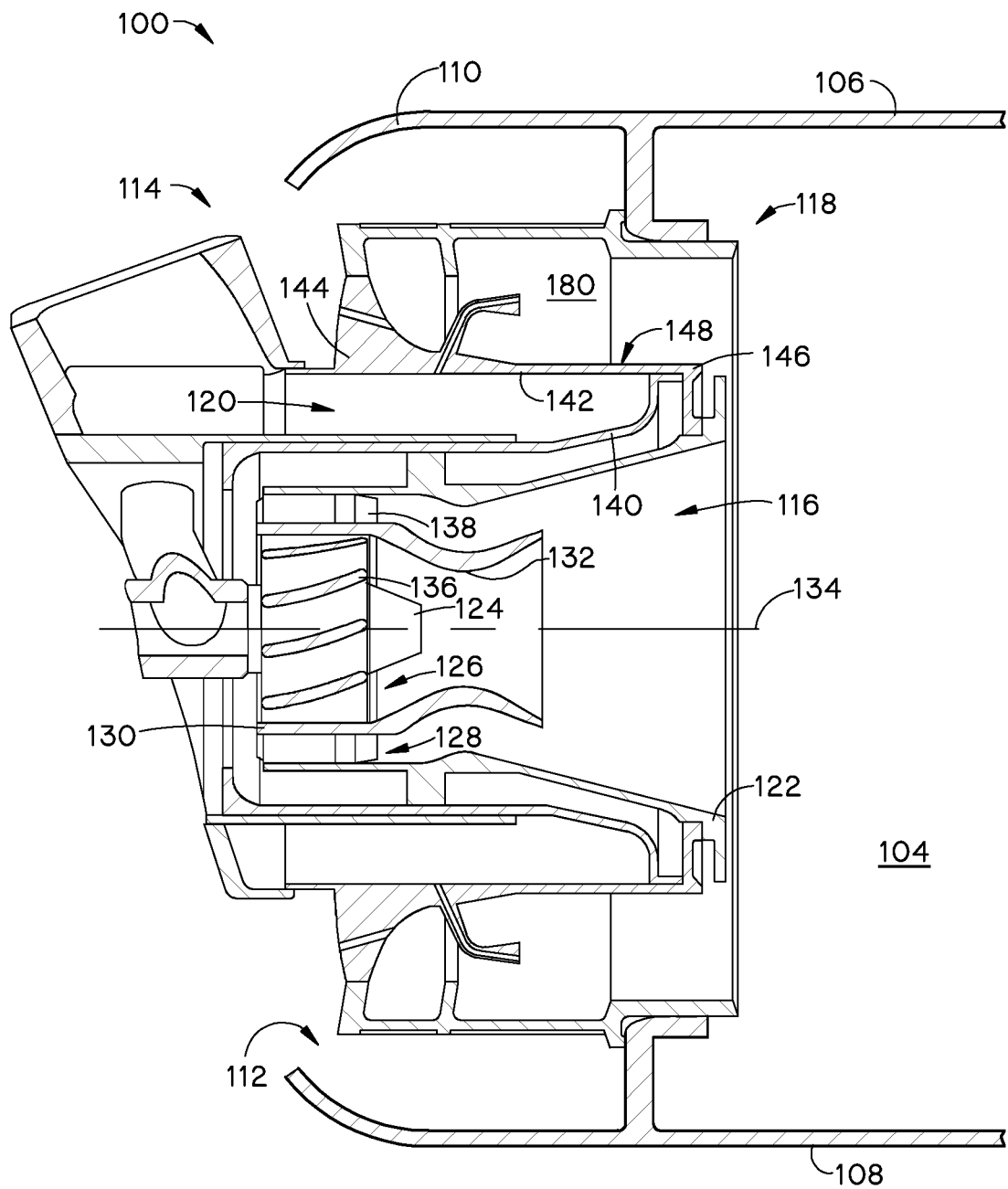
FIG. 2 is a schematic, cross-sectional view of a portion of a combustor suitable for use in the gas turbine engine shown in FIG. 1.

FIG. 2 shows the forward end of a combustor 100 having an overall configuration generally referred to as twin annular premixed swirler or "TAPS", suitable for incorporation into an engine such as engine 10 described above. The combustor 100 includes a hollow body defining a combustion chamber 104 therein. The hollow body is generally annular in form and is defined by an outer liner 106 and an inner liner 108. The upstream end of the hollow body is substantially closed off by a cowl 110 attached to the outer liner 106 and to the inner liner 108. At least one opening 112 is formed in the cowl 110 for the introduction of fuel and compressed air.

Located between and interconnecting the outer and inner liners 106, 108 near their upstream ends is a mixing assembly or dome assembly 114. The dome assembly 114 includes a pilot mixer 116, a main mixer 118, and a fuel manifold 120 positioned therebetween. More specifically, it will be seen that pilot mixer 116 includes an annular pilot housing 122 having a hollow interior, a pilot fuel nozzle 124 mounted in pilot housing 122 and adapted for dispensing droplets of fuel to the hollow interior of pilot housing 122. Further, pilot mixer 116 includes an inner pilot swirler 126 located at a radially inner position adjacent pilot fuel nozzle 124, an outer pilot swirler 128 located at a radially outer position from inner pilot swirler 126, and a pilot splitter 130 positioned therebetween. Pilot splitter 130 extends downstream of pilot fuel nozzle 124 to form a venturi 132 at a downstream portion.

The inner and outer pilot swirlers 126 and 128 are generally oriented parallel to a mixer centerline 134 through dome assembly 114 and include a plurality of vanes for swirling air traveling therethrough. More specifically, the inner pilot swirler 126 includes an annular array of inner pilot swirl vanes 136 disposed about mixer centerline 114. The inner pilot swirl vanes 126 are angled with respect to the mixer centerline 134 so as to impart a swirling motion (i.e., tangential velocity component) to the air flow passing therethrough.

The outer pilot swirler 128 includes an annular array of outer pilot swirl vanes 138 disposed coaxially about mixer centerline 134. The outer pilot swirl vanes 138 are angled with respect to the mixer centerline 134 so as to impart a swirling motion (i.e., tangential velocity component) to the air flow passing therethrough.

The main mixer 118 further includes an annular shroud 140 radially surrounding pilot housing 122 and an annular main housing 142 radially surrounding the shroud 140. The main housing 142 cooperates with the shroud 140 to define the fuel manifold 120.

The specific configuration of the shroud 140, pilot housing 122, and main housing 142 is merely one example of a possible structure to form the main mixer 118. Alternatively, some or all of the shroud 140, pilot housing 122, and main housing 142 may be combined into part of an integral, unitary or monolithic structure.

Figure 3:
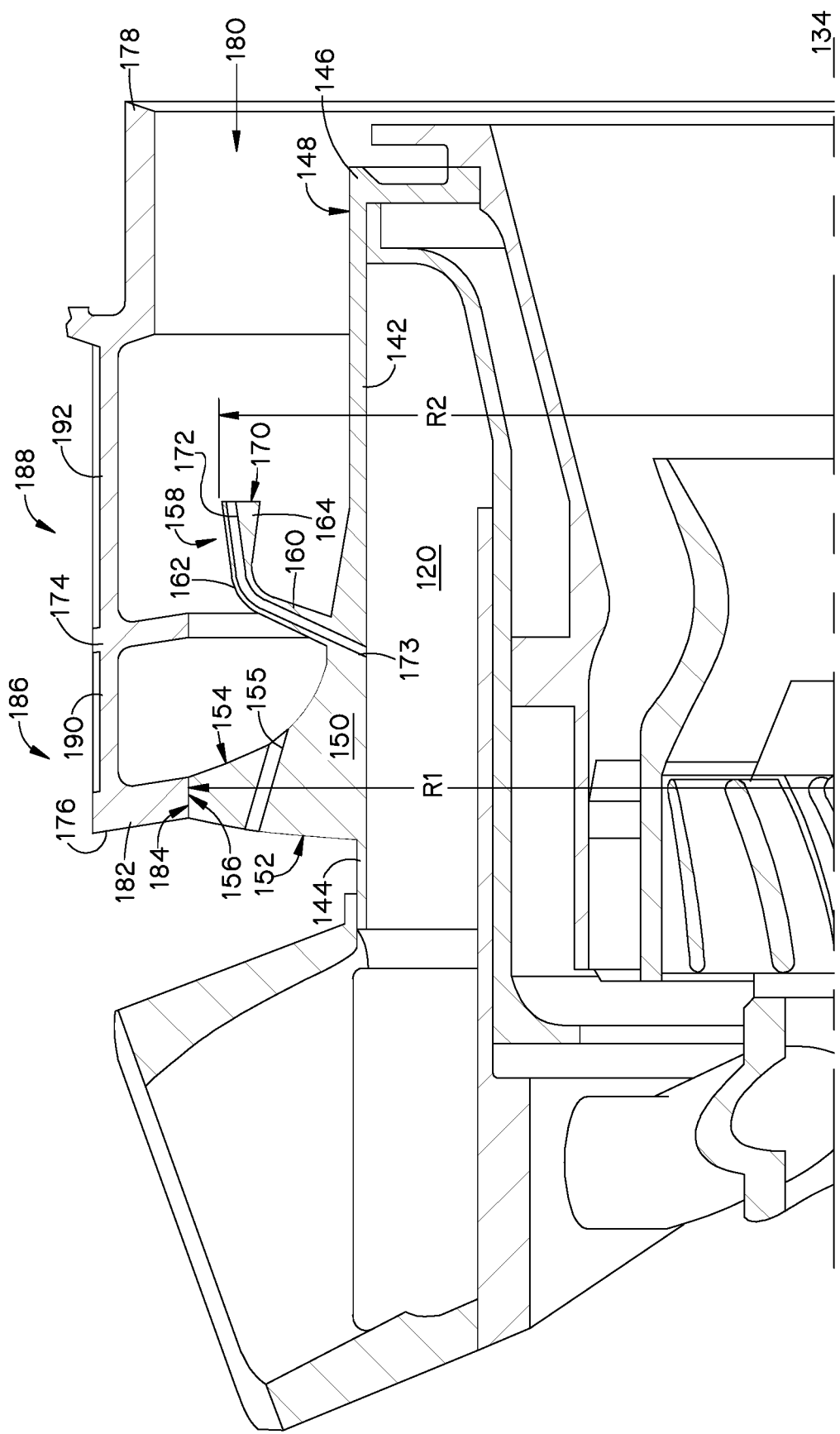
FIG. 3 is an enlarged view of a portion of FIG. 2.

The main housing 142 extends between a forward end 144 and an aft end 146. The overall shape of its outer surface 148 is generally cylindrical. Referring to FIG. 3, at the forward end 144, the main housing 142 extends radially outward to define a mixer foot 150. The mixer foot 150 is generally shaped like a tapered disk with a forward face 152 and an opposed aft face 154, interconnected by a generally radially outward facing outer surface 156. In this example, the forward face 152 is oriented close to parallel to the radial direction and the aft face 154 is sloped at an acute angle relative to the radial direction, smoothly transitioning into the remainder of the main housing 142. A plurality of slots 155 pass through the mixer foot 150.

A main fuel ring 158 is disposed around and spaced outboard from the main housing 142. A plurality of struts or fuel vanes 160 extend between the main housing 142 and the main fuel ring 158 to support and position the main fuel ring 158.

The dimensions of the mixer foot 150 and the main fuel ring 158 are selected such that that the outer extent of the mixer foot 150 (labeled radius "R1") is at a greater radius than an outer extent of the main fuel ring 158 (labeled radius "R2"). Stated another way, the mixer foot 150 protrudes further outboard than the main fuel ring 158.

Figure 4:
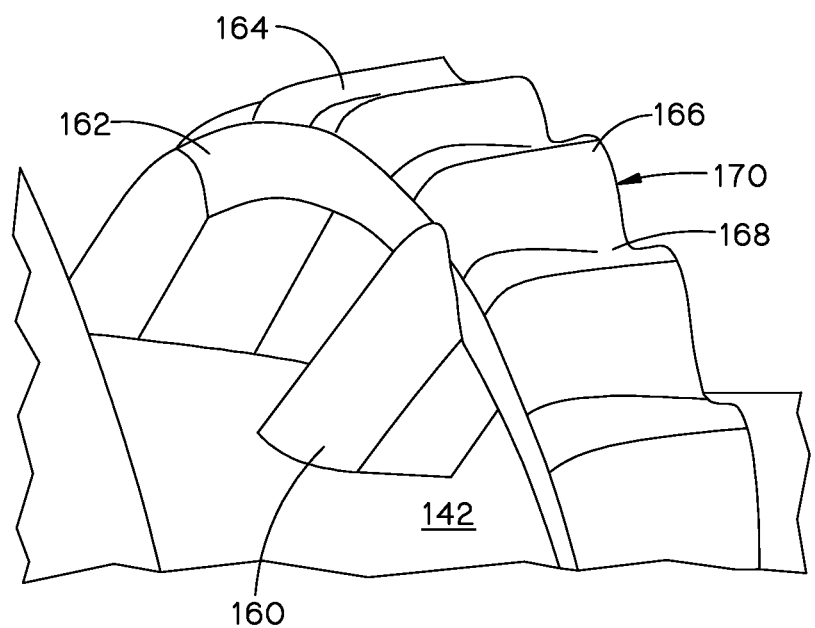
FIG. 4 is a schematic perspective view of a main fuel ring of the combustor shown in FIG. 2.
Figure 5:
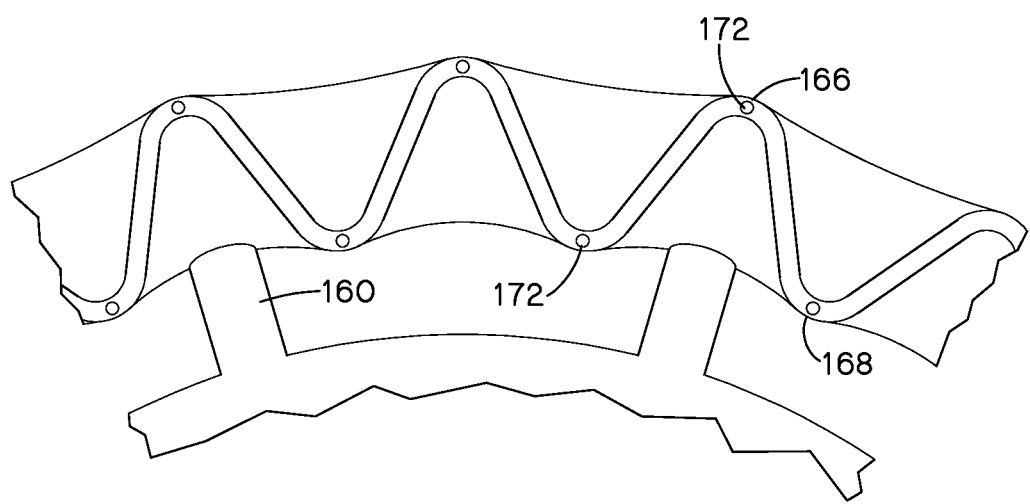
FIG. 5 is an aft elevation view of a portion of the main fuel ring shown in FIG. 4.

The main fuel ring 158 may be shaped to promote air/fuel mixing. In the illustrated example, the main fuel ring 158 has a continuous forward portion 162, blending into an aft portion 164 having an undulating shape with a radial array of convex outward peaks 166 alternating with concave outward chutes 168 (best seen in FIGS. 4 and 5). These may alternatively described as corrugations or chevrons. The aft portion 164 terminates in a generally flat aft-facing surface 170.

The main fuel ring 158 incorporates a plurality of fuel injection ports 172 which are effective to introduce fuel into a generally annular mixing channel 180. The number, shape, and location of the fuel injection ports 172 may be selected to suit a particular application. For example, the fuel injection ports 172 may be located on the aft-facing surface 170. In the illustrated example, one circular cross-section fuel injection port 172 is located at or near the apex of each peak 166 and each chute 168. The direction of discharge of fuel from the fuel injection ports 172 generally has a substantial axial component. It may be purely axial, or may include some radial component inward or outward, and/or some tangential component.

The fuel injection ports 172 are in fluid communication with fuel feed channels 173 which pass through the body of the main fuel ring 158 and through one or more of the main fuel vanes 160 to communicate with the main fuel manifold 120.

As illustrated (FIGS. 4, 5) the main fuel vanes 160 may have a streamlined shape. In one embodiment, the main fuel vanes 160 are configured so they do not introduce a tangential velocity component to air passing therethrough (i.e. they do not swirl the flow). Alternatively, the main fuel vanes 160 may be configured so they introduce a tangential velocity component air passing therethrough (i.e. swirl).

Referring back to FIG. 3, a main swirler body 174 surrounds the main housing 142. The main swirler body 174 extends between a forward end 176 which is mechanically coupled to the swirler foot 150 and an aft end 178. The generally annular mixing channel 180 is defined between the main housing 142 and the main swirler body 174.

The main swirler body 174 includes a forward bulkhead 182 at its forward end 176. The forward bulkhead 182 includes an inner surface 184 which is complementary to the outer surface 156 of the mixer foot 150.

The dimensional relationship described above (radius R1 greater than radius R2) will have the technical effect of permitting the main swirler body 174 to be assembled to the main housing 142 in a practical manner. For example, the main swirler body 174 may be slipped over the main housing 142 in an axial direction from aft to forward. The forward bulkhead 182 is able to pass over the main fuel ring 158 without interference and is slid further forward until its inner surface 184 engages the outer surface 156 of the mixer foot 150. The forward bulkhead 182 and the mixer foot 150 may be configured to embody a specific fit as required, for example a specific degree of clearance or a specific degree of interference. The two components may be joined by mechanical interference, a process such as welding or brazing, or a combination thereof.

The dimensions of the main fuel ring 158 may be selected to that it is positioned at a desired location within the mixing channel 180. For example, it may be positioned in approximately the center of the mixing channel 180, or stated another way, approximately halfway between the main housing 142 and the main swirler body 174. In one example, it may be positioned to discharge fuel into a central portion of the mixing channel 180, "central portion" referring to a band approximately 50% of the radial height of the mixing channel 180 and centered halfway between the main housing 142 and the main swirler body 174. Analysis by the inventors has shown that axial fuel injection at within the central portion of the mixing channel 180 can improve fuel-air mixing compared to conventional radial injection and also reduce the risk of fuel auto ignition.

The main swirler body 174 incorporates one or more swirlers each including a plurality of vanes configured to impart a tangential velocity component to air flowing therethrough.

In the illustrated example, the main swirler body 174 includes an upstream first main swirler 186 and a downstream second main swirler 188.

The first main swirler 186 is positioned upstream from the main fuel ring 158. As shown, the flow direction of the first main swirler 186 is oriented substantially radial to mixer centerline 134. The first main swirler 186 includes a plurality of first main swirl vanes 190. The first main swirl vanes 190 are angled with respect to the mixer centerline 134 so as to impart a swirling motion (i.e., tangential velocity component) to the air flow passing therethrough. More specifically, the first main swirl vanes 190 are disposed at an acute vane angle measured relative to a radial direction.

The second main swirler 188 is positioned overlapping the axial location of the main fuel ring 158 such that a portion of the second main swirler 188 is upstream from the main fuel ring 158 and a portion is downstream of the main fuel ring 158. The flow direction of the second main swirler 188 is oriented substantially radial to mixer centerline 134. The second main swirler 188 includes a plurality of second main swirl vanes 192. The second main swirl vanes 192 are angled with respect to the mixer centerline 134 so as to impart a swirling motion (i.e., tangential velocity component) to the air flow passing therethrough. More specifically, the second main swirl vanes 192 are disposed at an acute vane angle measured relative to an axial direction. The second main swirl vanes 192 may be oriented the same or opposite direction relative to the first main swirl vanes 190. Stated another way, both main swirlers 186, 188, may direct air in a clockwise or counterclockwise direction (co-rotating), or one main swirler may direct air in a clockwise direction while the other main swirler directs air in a counter-clockwise direction (contra-rotating).

Figure 6:
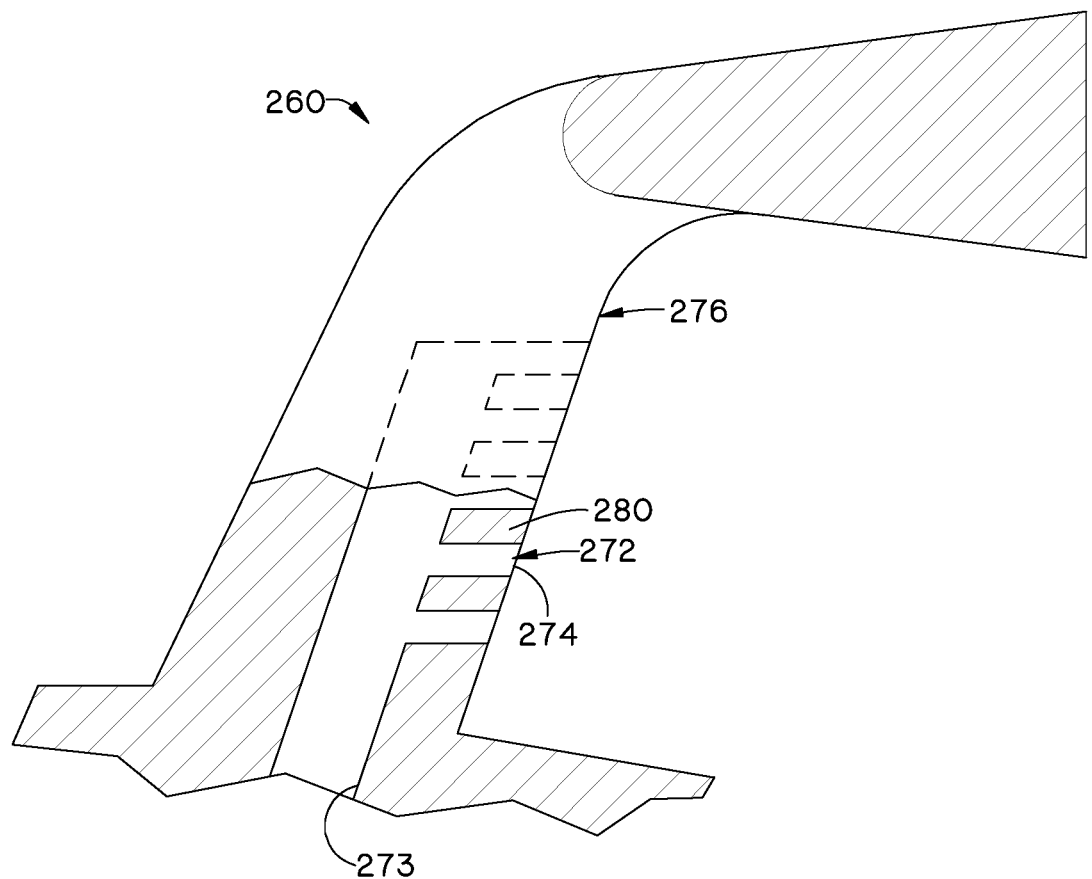
FIG. 6 is a cross-sectional view of an alternative main fuel ring construction.
Figure 7:
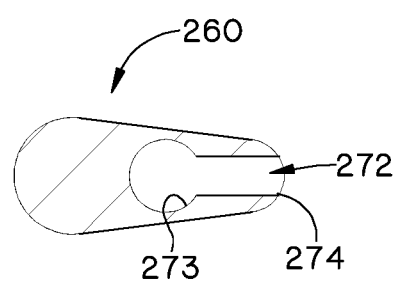
FIG. 7 is a cross-sectional view of a portion of the main fuel ring of FIG. 6.

In the example described above, the fuel injection ports 172 exit through the main fuel ring 158. Alternatively, or in addition to this structure, fuel may be discharged through the main fuel vanes 160. For example, FIGS. 6 and 7 illustrate an embodiment in which one or more main fuel vanes 260, which could be substituted for main fuel vanes 160, are provided with fuel injection ports 272. The fuel injection ports 272 may have cross-section shapes such as circular, elliptical, or polygonal. In the illustrated example, the individual fuel injection ports 272 each have an exit 274 at the trailing edge 276 of the main fuel vane 260. They are in flow communication with a fuel feed channel 273 inside the main fuel vane 260 that in turn communicates with a fuel manifold (not shown in this view) and are separated from each other by walls 280. The walls 280 are effective to generate shearing forces in the fuel flow to promote air/fuel mixing as well as reducing auto-ignition risk. As with the fuel injection ports 172 described above, the direction of discharge of fuel from the fuel injection ports 272 may be selected to suit a particular application. It may be purely axial, or may include some radial component inward or outward, and/or some tangential component.

The main fuel vanes (e.g. embodiments 160 or 260) may optionally be configured so as to discourage heat transfer into the interior and thereby reduce the chance of carbon formation ("coking") of the fuel.

Figure 8:
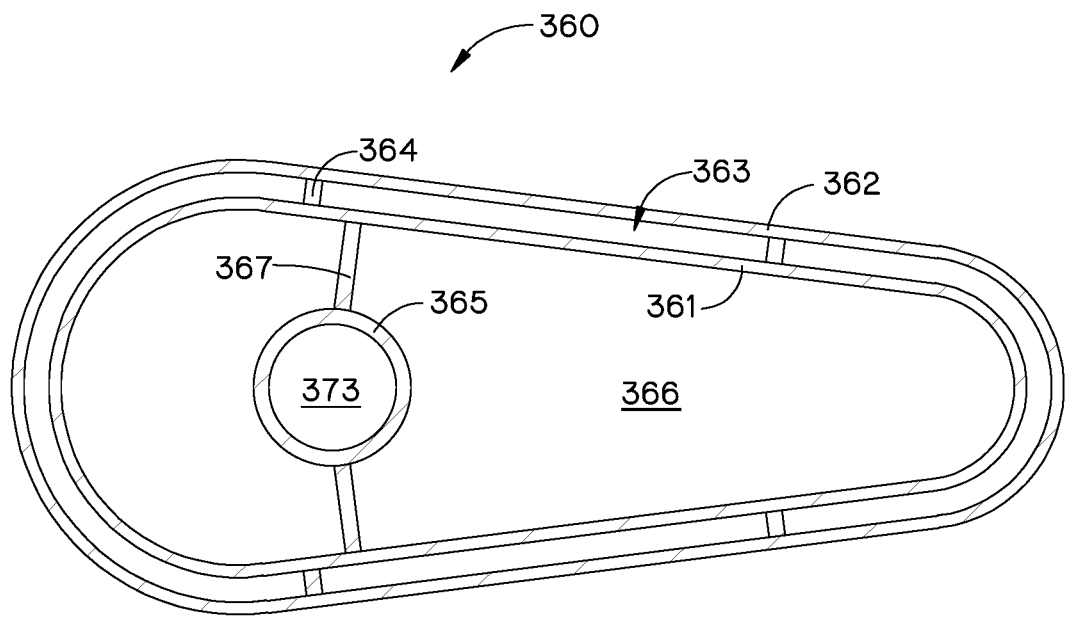
FIG. 8 is a cross-sectional view of an exemplary embodiment of a main fuel vane.

For example, FIG. 8 shows a cross-sectional view of an alternate construction of a main fuel vane 360, which could be substituted for main fuel vane 160, having a double-wall construction with an inner wall 361 and outer wall 362 separated by an airspace 363. The inner and outer walls 361, 362 may be separated by small struts or spacers 364. This airspace 363 may contain a layer of stagnant air in operation, providing thermal insulation. In the example shown in FIG. 4, the fuel feed channel 373 may be in the form of a hollow tube 365 contained within a hollow interior space 366 defined by the inner wall 361 and supported by struts or spacers 367.

Figure 9:
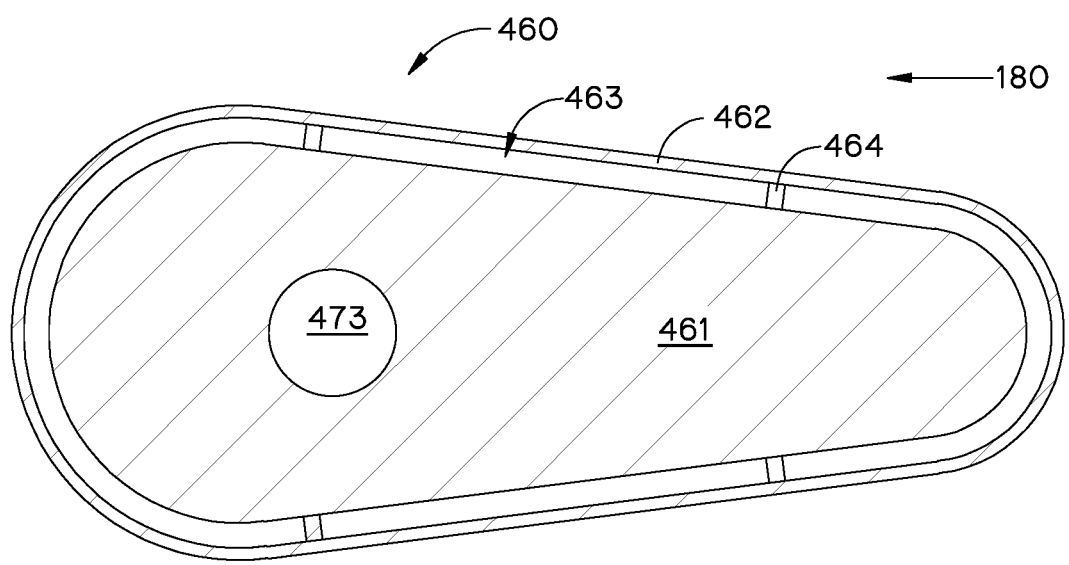
FIG. 9 is a cross-sectional view of an alternative exemplary embodiment of a main fuel vane.

In another alternate configuration shown in FIG. 9, a main fuel vane 460, which could be substituted for main fuel vane 160, may have a solid core 461 surrounded by an outer wall 462, the two elements being separated by an airspace 463. Interconnecting struts or spacers 464 may be provided. In this configuration, a fuel feed channel 473 may be formed directly into solid core 461.

FIG. 10 illustrates an alternative embodiment of a mixing assembly or dome assembly designated 514. The dome assembly 514 includes a pilot mixer 516, a main mixer 518, and a fuel manifold 520 positioned therebetween. The dome assembly 514 is similar in many aspects of the dome assembly 114 described above. Elements not specifically described may be considered to be identical to corresponding elements of dome assembly 114. The pilot mixer 516 includes a pilot housing 522, a pilot fuel nozzle 524 mounted in housing 522, an inner pilot swirler 526 located at a radially inner position adjacent pilot fuel nozzle 524, an outer pilot swirler 528 located at a radially outer position from inner pilot swirler 526, and a pilot splitter 530 positioned therebetween. Pilot splitter 530 extends downstream of pilot fuel nozzle 524 to form a venturi 532 at a downstream portion.

The inner and outer pilot swirlers 526 and 528 include inner swirl vanes 536 and outer swirl vanes 538, respectively.

The main mixer 518 further includes an annular main housing 542 radially surrounding pilot housing 522.

The main housing 542 extends between a forward end 544 and an aft end 546. The overall shape of its outer surface 548 is generally cylindrical. At the forward end 544, a mixer foot 550 extends outward from the main housing 542. The mixer foot 550 has a forward face 552 and an opposed aft face 554, interconnected by a generally radially outward facing outer surface 556. In this example, the forward face 552 is oriented close to the radial direction and the aft face is sloped at an acute angle relative to the radial direction, smoothly transitioning into the remainder of the main housing 542.

Figure 11:
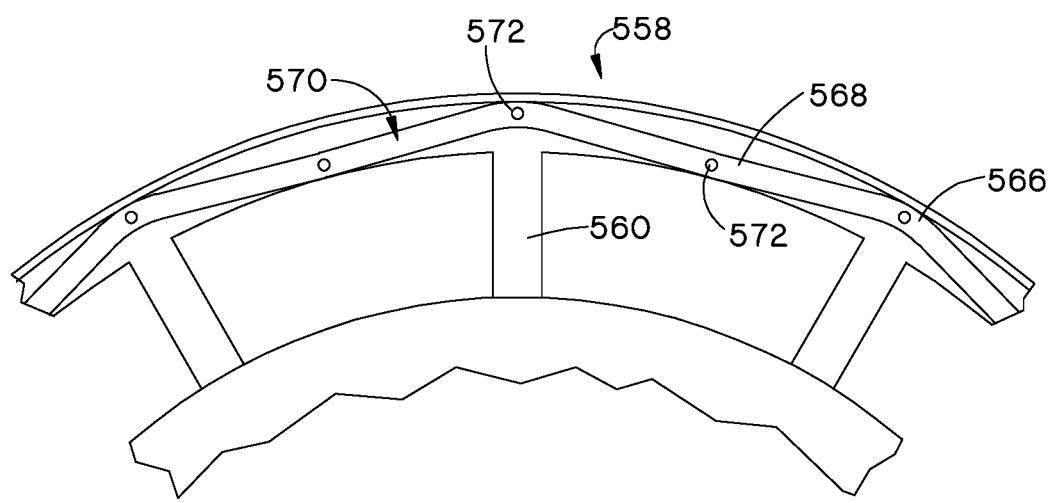
FIG. 11 is an aft elevation view of a portion of the mixing assembly of FIG. 10.

As best seen in FIG. 11, The mixer foot 550 comprises an annular array of struts or fuel vanes 560. FIG. 10 shows a sectional view through one of the fuel vanes 560.

A main fuel ring 558 extends axially aft from the aft face 554 of the mixer foot 560. It extends around and is spaced outboard from the main housing 542. The dimensions of the mixer foot 550 and the main fuel ring 558 are selected such that that the outer extent of the mixer foot 550 (labeled radius "R3") is at a greater radius than an outer extent of the main fuel ring 558 (labeled radius "R4"). Stated another way, the mixer foot 550 protrudes further outboard than the main fuel ring 558.

The main fuel ring 558 may be shaped to promote air/fuel mixing. In the illustrated example, the main fuel ring 558 has an aft portion having an undulating shape with a radial array of convex outward peaks 566 alternating with concave outward chutes 568 (FIG. 11). These may alternatively be described as corrugations or chevrons. It terminates in a generally flat aft-facing surface 570.

Figure 12:
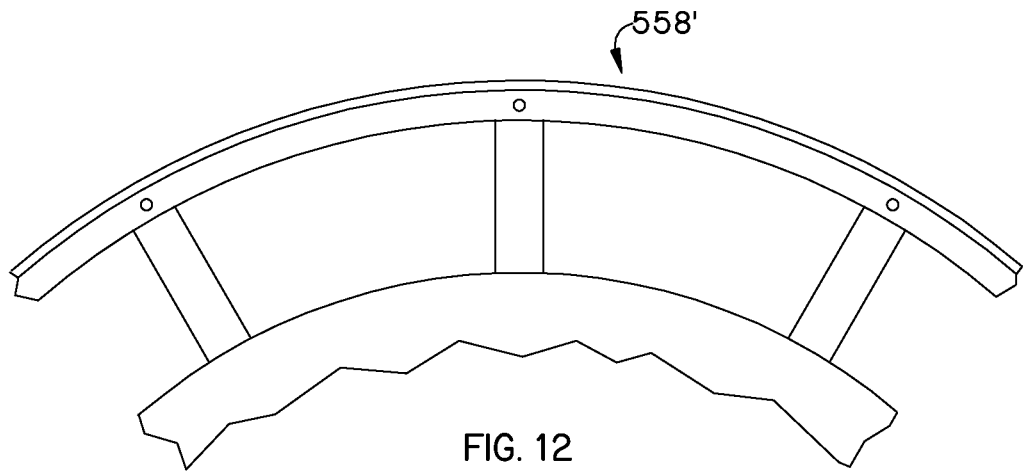
FIG. 12 is an aft elevation view of an alternative construction of the mixing assembly FIG. 10.

In an alternative configuration, illustrated in FIG. 12, the main fuel ring 558' has a continuous annular shape, for example generally cylindrical.

The main fuel ring 558 incorporates a plurality of fuel injection ports 572 which are effective to introduce fuel into mixing channel 580. The number, shape, and location of the fuel injection ports 572 may be selected to suit a particular application. For example, the fuel injection ports 572 may be located on the aft-facing surface 570. In the illustrated example, one circular cross-section fuel injection port 572 is located at or near the apex of each peak 566 and chute 568. The direction of discharge of fuel from the fuel injection ports 572 may be generally axial. It may be purely axial, or may include some radial component inward or outward, and/or some tangential component.

The fuel injection ports 572 are in fluid communication with fuel feed channels 573 which pass through the body of the main fuel ring 558 and through one or more of the main fuel vanes 560 to communicate with the main fuel manifold 520.

The main fuel vanes 560 may have a streamlined shape. In one embodiment, the main fuel vanes 560 are configured so they introduce a tangential velocity component air passing therethrough (i.e. swirl). Alternatively, the main fuel vanes 560 may be configured so they do not introduce a tangential velocity component to air passing therethrough (i.e. they do not swirl of the flow).

A main swirler body 574 surrounds the main housing 542. The main swirler body 574 extends between a forward end 576 which is mechanically coupled to the main swirler foot 550 and an aft end 578. The main swirler body 574 includes a forward bulkhead 582 at its forward end 576. The forward bulkhead 582 includes an inner surface 584 which is complementary to the outer surface 556 of the mixer foot 550.

The dimensional relationship described above (radius R3 greater than radius R4) will have the technical effect of permitting the main swirler body 574 to be assembled to the main housing 542 in a practical manner as described above. The forward bulkhead 582 and the mixer foot 550 may be configured to embody a specific fit as required, for example a specific degree of clearance or a specific degree of interference. The two components may be joined by mechanical interference, a process such as welding or brazing, or a combination thereof.

The dimensions of the main fuel ring 558 may be selected to that it is positioned at a desired location within the mixing channel 580. For example, it may be positioned in approximately the center of the mixing channel 580, or stated another way, approximately halfway between the main housing 542 and the main swirler body 574. In one example, it may be positioned to discharge fuel into a central portion of the mixing channel 580, "central portion" referring to a band approximately 50% of the radial height of the mixing channel 580 and centered halfway between the main housing 542 and the main swirler body 574. Analysis by the inventors has shown that axial fuel injection at within the central portion of the mixing channel 580 can improve fuel-air mixing compared to conventional radial injection and also reduce the risk of fuel auto ignition.

The main swirler body 574 incorporates one or more swirlers each including a plurality of vanes configured to impart a tangential velocity component to air flowing therethrough. In the illustrated example, the main swirler body 574 includes a main swirler 586. The main swirler 586 is positioned radially outboard of the main fuel ring 558. As shown, the flow direction of the main swirler 586 is oriented substantially radial to the mixer centerline 534. The main swirler 586 includes a plurality of vanes 588. The vanes 588 are angled with respect to the centerline 534 so as to impart a swirling motion (i.e., tangential velocity component) to the air flow passing therethrough. More specifically, the vanes are disposed at an acute vane angle measured relative to a radial direction.

The vanes 588 may be oriented the same or opposite direction relative to the fuel vanes 560. Stated another way, both swirlers may direct air in a clockwise or counterclockwise direction (co-rotating), or one swirler may direct air in a clockwise direction while the other swirler directs air in a counter-clockwise direction (contra-rotating).

Figure 13:
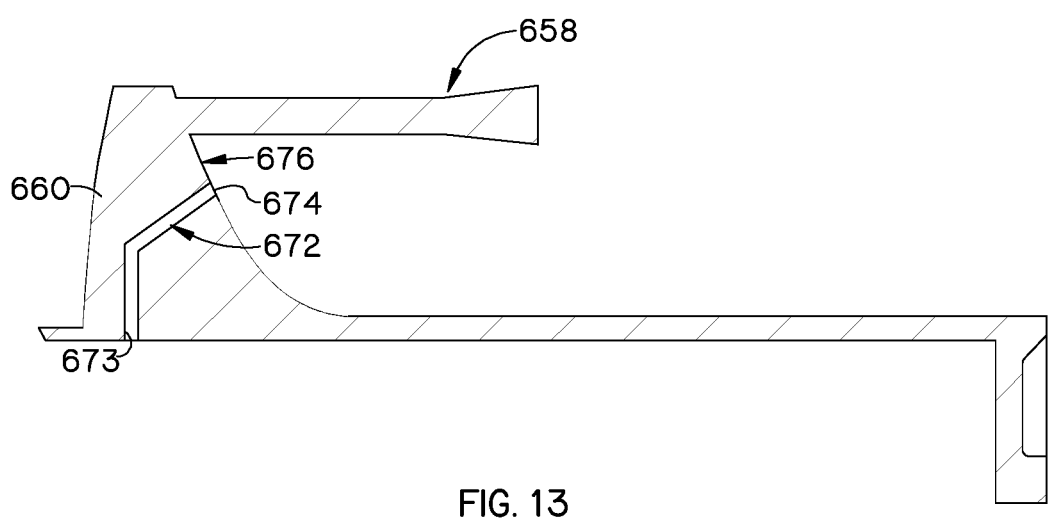
FIG. 13 is a half-sectional view of a portion of an alternative construction of a mixing assembly.

In the example described above, the fuel injection ports 572 exit through the main fuel ring 558. Alternatively, or in addition to this structure, fuel may be discharged through the main fuel vanes 560. For example, FIG. 13 illustrates an embodiment in which one or more main fuel vanes 660, which could be substituted for main fuel vanes 560, are provided with fuel injection ports 672. The fuel injection ports 672 may have cross-section shapes such as circular, elliptical, or polygonal. In the illustrated example, the individual fuel injection ports 672 each have an exit 674 at the trailing edge 676 of the main fuel vane 660. They are in flow communication with a fuel feed channel 673 inside the main fuel vane 660 that in turn communicates with a fuel manifold (not shown in this view) As with the fuel injection ports 572 described above, the direction of discharge of fuel from the fuel injection ports 672 may be selected to suit a particular application. It may be purely axial, or may include some radial component inward or outward, and/or some tangential component. In one example, the fuel injection ports 672 may be oriented to discharge fuel outwards against a radially inner surface of a main fuel ring 658 analogous to main fuel ring 558 described above.

The mixing assembly described herein has advantages over the prior art. It has the capability to provide improved fuel/air mixing, reduced emissions, and smaller mixing assemblies.

The foregoing has described a mixing assembly for a combustor. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Additional aspects of the present invention are provided by the following numbered clauses:

1. A mixing assembly for a combustor, comprising: a pilot mixer including an annular pilot housing having a hollow interior extending along a mixer centerline and a pilot fuel nozzle mounted in the housing; a main mixer including: a main housing surrounding the pilot, the main housing having forward and aft ends; a fuel manifold positioned between the pilot housing and the main housing; a mixer foot extending outward from the forward end of the main housing; a main swirler body including a plurality of vanes, the main swirler body surrounding the main housing such that an annular mixing channel is defined between the main housing and the main swirler body, and being coupled to the mixer foot; and a main fuel ring disposed in the mixing channel downstream of the mixer foot and connected to the main housing by an array of main fuel vanes, at least one of the main fuel ring and the main fuel vanes including a plurality of fuel injection ports positioned to discharge fuel into a central portion of the mixing channel, wherein the mixer foot extends farther from the main housing than the main fuel ring.

2. The mixing assembly of any preceding clause wherein the main fuel ring is positioned in a central portion of the mixing channel.

3. The mixing assembly of any preceding clause wherein the main fuel ring includes a plurality of fuel injection ports.

4. The mixing assembly of any preceding clause wherein the main fuel vanes include a plurality of fuel injection ports.

5. The mixing assembly of any preceding clause wherein the main fuel vanes are oriented to produce swirl in a flow passing therethrough.

6. The mixing assembly of any preceding clause wherein an aft portion of the main fuel ring includes a plurality of corrugations.

7. The mixing assembly of any preceding clause wherein the mixer foot includes a plurality of slots passing therethrough.

8. The mixing assembly of any preceding clause wherein the main swirler body includes an upstream first main swirler and a downstream second main swirler.

9. The mixing assembly of any preceding clause in combination with an annular inner liner and an annular outer liner spaced apart from the inner liner, wherein the mixing assembly of any preceding clause is disposed at an upstream end of the inner and outer liners.

10. A mixing assembly for a combustor, comprising: a pilot mixer including an annular pilot housing having a hollow interior extending along a mixer centerline and a pilot fuel nozzle mounted in the housing; a main mixer including: a main housing surrounding the pilot, the main housing having forward and aft ends; a fuel manifold positioned between the pilot housing and the main housing; a mixer foot extending outward from the forward end of the main housing; a main swirler body including a plurality of vanes, the main swirler body surrounding the main housing such that an annular mixing channel is defined between the main housing and the main swirler body, and being coupled to the mixer foot; and an annular main fuel ring extending axially aft from the mixer foot into the mixing channel, wherein the mixer foot extends farther from the main housing than the main fuel ring; and wherein at least one of the mixer foot and the main fuel ring includes a plurality of fuel injection ports positioned to discharge fuel into a central portion of the mixing channel.

11. The mixing assembly of any preceding clause wherein the main fuel ring is positioned in a central portion of the mixing channel.

12. The mixing assembly of any preceding clause wherein the main fuel ring includes a plurality of fuel injection ports.

13. The mixing assembly of any preceding clause wherein the mixer foot includes a plurality of fuel injection ports.

14. The mixer assembly of any preceding clause wherein the fuel injection ports are oriented to discharge fuel at a radially inboard surface of the main fuel ring.

15. The mixing assembly of any preceding clause wherein: the mixer foot includes an array of main fuel vanes; and the fuel injection ports are disposed in the main fuel vanes.

16. The mixing assembly of any preceding clause wherein the main fuel vanes are oriented to produce swirl in a flow passing therethrough.

17. The mixing assembly of any preceding clause wherein an aft portion of the main fuel ring includes a plurality of corrugations.

18. The mixing assembly of any preceding clause wherein the main swirler body includes a radial-inflow swirler positioned radially outboard of the main fuel ring.

19. The mixing assembly of any preceding clause wherein: the mixer foot includes an array of main fuel vanes; and the main fuel vanes are oriented to produce swirl in a flow passing therethrough.

20. The mixing assembly of any preceding clause in combination with an annular inner liner and an annular outer liner spaced apart from the inner liner, wherein the mixing assembly of any preceding clause is disposed at an upstream end of the inner and outer liners.

What is claimed is:
1. A mixing assembly for a combustor, comprising:
a pilot mixer including an annular pilot housing having a hollow interior extending along a mixer centerline and a pilot fuel nozzle mounted in the annular pilot housing;
a main mixer including:
a main housing surrounding the annular pilot housing, the main housing having a forward end and an aft end;
a fuel manifold positioned between the annular pilot housing and the main housing;
a mixer foot extending outward from the forward end of the main housing;
a main swirler body including a plurality of swirl vanes, the main swirler body surrounding the main housing such that an annular mixing channel is defined between the main housing and the main swirler body, and the main swirler body being coupled to the mixer foot to define a forward end of the annular mixing channel; and a main fuel ring disposed in the annular mixing channel downstream of the mixer foot and connected to the main housing by a plurality of main fuel vanes arranged in a circumferential array about the mixer centerline, each main fuel vane of the plurality of main fuel vanes extending outward from the main housing into the annular mixing channel, the main fuel ring including a first plurality of fuel injection ports positioned to discharge fuel into a central portion of the annular mixing channel, wherein the mixer foot extends outward farther from the main housing than the main fuel ring;

wherein the main fuel ring is positioned in the central portion of the mixing channel, the central portion being defined radially from the mixer centerline and extending circumferentially about the mixer centerline, wherein the fuel manifold is radially inward of the plurality of main fuel vanes and supplies the fuel to the plurality of main fuel vanes and the main fuel ring, and wherein an aft portion of the main fuel ring includes a plurality of corrugations forming a lobed mixer.

2. The mixing assembly of claim 1, wherein the plurality of main fuel vanes include a second plurality of fuel injection ports.

3. The mixing assembly of claim 1, wherein the plurality of main fuel vanes are oriented to produce swirl in a flow of air passing therethrough.

4. The mixing assembly of claim 1, wherein the mixer foot includes a plurality of slats passing therethrough.

5. The mixing assembly of claim 1, wherein the main swirler body includes an upstream first main swirler and a downstream second main swirler.

6. A combustor for ag turbine, comprising:

an annular inner liner having an upstream end and a downstream end;

an annular outer liner having an upstream end and a downstream end; and a mixer assembly, comprising:

a pilot mixer inducing an annular allot housing having a hollow interior extending along a mixer centerline and a pilot fuel nozzle mounted in the annular pilot housing;

a main mixer including:

a main housing surrounding the annular pilot housing, the main housing having a forward end and an aft end;

a fuel manifold positioned between the annular pilot housing and the main housing;

a mixer foot extending outward from the forward end of the main housing;

a main swirler body including a plurality of swirl vanes, the main swirler body surrounding the main housing such that an annular mixing channel is defined between the main housing and the main swirler body, and the main swirler body being coupled to the mixer foot to define a forward end of the annular mixing channel; and a main fuel ring disposed in the annular mixing channel downstream of the mixer foot and connected to the main housing by a plurality of main fuel vanes arranged in a circumferential array about the mixer centerline, each main fuel vane of the plurality of main fuel vanes extending outward from the main housing into the annular mixing channel, the main fuel ring including a first plurality of fuel injection ports positioned to discharge fuel into a central portion of the annular mixing channel, wherein the mixer foot extends outward farther from the main housing than the main fuel ring;

wherein the main fuel ring is positioned in the central portion of the mixing channel, the central portion being defined radially from the mixer centerline and extending circumferentially about the mixer centerline, wherein the fuel manifold is radially inward of the plurality of main fuel vanes and supplies the fuel to the plurality of main fuel vanes and the main fuel ring, and wherein an aft portion of the main fuel ring includes a plurality of corrugations forming a lobed mixer;

wherein the mixer assembly is disposed at the upstream end of the annular inner liner and at the upstream end of the annular outer liner.

* * * * *